US007428596B2

(12) United States Patent  
Grandemange et al.

(10) Patent No.: US 7,428,596 B2
(45) Date of Patent: Sep. 23, 2008

(54) MULTIPLEXING UNIT, SYSTEM AND METHOD FOR COMMUNICATION IN A COMPUTER NETWORK

(75) Inventors: Alexis Grandemange, Nice (FR); Véronique Marquion, Nice (FR); Pierre Dor, Nice (FR); Vincent Lextrait, Nice (FR); François Weissert, Nice (FR)

(73) Assignee: Amadeus s.a.s., Biot (FR)

( * ) Notice: Subject to any disclaimer, the term of this patent is extended or adjusted under 35 U.S.C. 154(b) by 522 days.

(21) Appl. No.: 10/381,981

(22) PCT Filed: Oct. 2, 2001

(86) PCT No.: PCT/FR01/03041

§ 371 (c)(1),
(2), (4) Date: Sep. 12, 2003

(87) PCT Pub. No.: WO02/30085

PCT Pub. Date: Apr. 11, 2002

(65) Prior Publication Data

US 2004/0062255 A1    Apr. 1, 2004

(51) Int. Cl.
*G06F 15/173* (2006.01)
(52) U.S. Cl. ..................................................... 709/238
(58) Field of Classification Search .................. 709/238, 709/223, 230, 237
See application file for complete search history.

(56) References Cited

U.S. PATENT DOCUMENTS 5,495,426 A * 2/1996 Waclawsky et al. ......... 709/226
5,799,173 A   8/1998 Gossler et al.
5,951,694 A   9/1999 Choquier et al.
6,330,617 B1 * 12/2001 Bamforth et al. ............ 709/246
6,470,394 B1 * 10/2002 Bamforth et al. ............ 709/241
6,515,994 B1 *  2/2003 Chuah et al. ............. 370/395.6
7,082,476 B1 *  7/2006 Cohen et al. ................ 709/246

FOREIGN PATENT DOCUMENTS

| EP | 0 969 367   | 1/2000 |
| WO | WO 99/44155 | 9/1999 |
| WO | WO 00/28433 | 5/2000 |
| WO | WO 00/46683 | 8/2000 |

OTHER PUBLICATIONS

Chicago-Soft et al: "Dllagator version 2.0 Gerneral availability" Internet Citation, Apr. 6, 1998.
B. Schiemann et al: "A new approach for load balancing in high-performance decision support systems", Future Generations Computer Systems, NL, Elsevier Science Publishers, Amsterdam, vol. 12, No. 5, Apr. 1, 1997, pp. 345-355.

* cited by examiner

*Primary Examiner*—David Y Eng
(74) *Attorney, Agent, or Firm*—Young & Thompson (57) ABSTRACT

The invention concerns a multiplexing unit, a system and a method for communication in a computer network between a plurality of client machines supporting client programmes and one or several servers supporting application programmes, although said client and application programmes may be incompatible. The invention uses input and output management modules assigned to the client machines and to the servers. It performs conversion operations and routing operations, which are carried out so as to optimise the operation of the servers. It ensures communication between applications having incompatible formats or transfer protocols and this by means of a flexible technique with characteristics of modularity and upgradability. The invention is applicable in particular to computerised reservation systems for example in the field of travels and transport.

17 Claims, 4 Drawing Sheets

MULTIPLEXING UNIT, SYSTEM AND METHOD FOR COMMUNICATION IN A COMPUTER NETWORK

This invention relates to a multiplexing unit for communication in a computer network among a number of client machines that support client programs and one or more servers that support application programs, whereby the client programs and the application programs may be incompatible.

It also deals with a communication system that integrates one or more of such units, as well as a process that it will be able to use.

The invention will find its application in particular in the field of travel or shipping reservations by computerized systems.

Such systems, commonly called CRS (computerized reservation systems), use communications by computer networks to connect clients (such as agents in the travel sector or private individuals) and the central services of companies dealing with reservations.

These systems are brought in to provide very diverse components such as servers, computer terminals, and individual e-mail using varied and often multipart links that consist of local or worldwide networks.

This heterogeneity is also found at the level of data formats and communication protocols. If certain protocols, such as the HTTP/HTML combination, are adequately standardized to limit interoperability problems, others such as IIOP or JRMP require that the parts agree on common interfaces even if the manner of showing it on a network is standardized.

There is therefore a significant need to rationalize the mode of operation and communication in computerized systems as described above.

On this subject, multiplexing devices are currently proposed according to several variants. Overall, they ensure a centralization of connections and a reduction in the number of connections necessary for data routing.

They do not provide full satisfaction, however. Thus, they have problems of response time or, when they are set up close to a group of machines, they are awkward to run.

Furthermore, it is hard to administer a large number of clients: it is necessary that the servers support several versions of applications to meet the requests of clients whose software systems are at different update levels.

Another drawback of the current systems is that their use is not flexible, in particular in terms of the load distribution between the servers, fault management and possible bottlenecks.

Solutions to the problems mentioned were proposed, such as the use of middleware.

This is software that acts as an intermediary between a client part and a server part of the system.

Their use involves, however, awkward adaptations of the applications. They therefore weigh on the costs and development periods. This drawback is all the more important, provided that the middleware should also be deployed, which increases the risks of non-interoperability and complicates the administration tasks.

In terms of compatibility of the applications brought into play in computerized systems, the multiplexing means and the middleware currently known do not offer any specific solution.

Known from document WO-A-99,44155, however, is a device for the conversion of data and the distribution of load in a computer network. According to this document, conversion of the data into a fixed format is initiated systematically so as to facilitate their processing. A system of assigning a server to certain clients and managing their throttling is also shown.

This system is static and does not make it possible to select the server based on the contents of the client messages.

This device is clearly oriented toward using a unique protocol that is EDIFACT. It does not seek to ensure complete compatibility, regardless of the formats and protocols used by a given server.

Furthermore, the proposed load distribution is limited to specific circumstances and does not seek to administer the activity of the servers globally. In addition, this system is not modular, which hinders its upgradability, and the path followed by the messages comprises numerous steps that unfavorably influence the response time of the network.

The mechanism is produced in the code of clients and servers that should therefore be modified to use it.

The invention that is proposed here has as its object to remedy the drawbacks of the techniques known until then.

One of its first objectives is to ensure an effective conversion of messages to make them compatible with any target application. The invention therefore makes possible communication between all of the components of the network.

In the same step, it makes it possible to organize the multiplexing of data by using input and output management modules that are easily controlled by an administration element: for example, the integration of a new type of client in the system will be carried out quickly by the creation of a new input management module. As for clients who use the same protocol that is used under the same conditions, they will be able to share the same input management module. It is seen well that the invention set forth here offers modularity and a capacity for adaptation to the structural or functional evolution of the network.

It also ensures an optimized management of the throttling of servers by a load distribution according to determined criteria, such as the nature of the request, the space requirement, and possible faults.

This unit can also be administered in a centralized way.

Other objects and advantages of the invention will emerge during the following description that exhibits a preferred but non-limiting embodiment.

This invention relates to a multiplexing unit for communication in a computer network among a number of client machines that support client programs and one or more servers that support application programs, whereby the client programs and the application programs may be incompatible, characterized by the fact that it comprises:

For each type of client machine, an input management module that receives requests from client programs and transmits the responses to them;

For a server or a group of servers, an output management module that transmits to the server the client messages that are addressed to it and that transmits the responses to the input management modules of the client machines;

Routing means that are connected to input and output management modules that are able to define the identity of at least one output management module for the processing of a request and to determine the identity of the client machine to which the message that is obtained from the target server is to be addressed;

And conversion means that are able to convert, if necessary, the contents of the request into a client message that is compatible with the application program of the target server and the contents of the message that is obtained from the target server into a response that is compatible with the client program.

This unit can be presented under the following variants:

The routing means comprise load distribution means that can define the identity of a target server for the processing of a request according to load conditions, The routing means comprise at least one routing application module that can be attached to the remainder of the routing means and that can carry out routing functions according to predetermined rules, The conversion means comprise at least one conversion application module that can be attached to the remainder of the conversion means and can carry out predetermined conversion functions, The output management modules comprise a queue file device that can concentrate the input to the servers, It comprises an administration module that can administer the creation, the suppression, the modification and the state of operation of the input and output management modules.

The invention also relates to a system for communication in a computer network among a number of client machines that support client programs and one or more servers that support application programs, whereby the client programs and the application programs may be incompatible, characterized by the fact that it integrates at least one multiplexing unit according to the invention.

According to an embodiment, the system comprises a monitoring agent that can control the administration module of the multiplexing unit or units.

According to another possibility, it comprises extensions in the form of dynamic link libraries that can be loaded by a multiplexing unit to hold application modules.

Finally, the invention describes a process for communication in a computer network among a number of client machines that support client programs and one or more servers that support application programs, whereby the client programs and the application programs may be incompatible, able to be used by the system according to the invention, characterized by the fact that Each client machine of a type under consideration is connected to an input management module that receives the requests of the client program and transmits the responses to it; an output management module that transmits to the server the client messages that are addressed to it and that transmits the responses to the input management modules of the client machines is connected to a server;

The request is routed by recognition of the data of the request including the address of the input management module and the network address of the client machine from which it is obtained, then at least one target server is determined according to these data;

The request is converted into a client message of a format that is compatible with the target server or servers;

The client message is routed to the output management module of the target server for transmission;

The message that is obtained from the target server is routed and transmitted by the output management module by recognition of the message that is obtained from the target server, then the corresponding client machine is determined according to the result of this recognition;

If necessary, before or after its routing, the message that is obtained from the target server is converted into a response of a format that is compatible with the client machine or machines;

The response is routed to the input management module of the client machine for transmission.

This process may comprise the following stages:

The data of the request that are recognized for its routing comprise the nature of its contents, For the routing of the request and the message that is obtained from the target server, at least one attachable routing application module is invoked to carry out predetermined routing functions, For the conversion of the request and the message that is obtained from the target server, at least one attachable conversion application module is invoked to carry out predetermined conversion functions.

The throttling is administered differently according to the number and the nature of the output management modules that are selected by the routing mechanism.

If a single output management module was found during the routing and receives throttling messages, the throttling is then administered by:

Definition, at the level of the output management module, of a maximum number of messages that can be processed by the server up to a new definition;

Counting the number of client messages received by the output management module;

Subtraction of the number of client messages received from the maximum number to obtain a number of acceptable messages so as to determine a throttling level.

If all of the output management modules that are found during the routing receive throttling messages, the following operations are carried out for each one:

Definition, at the level of the output management module, of a maximum number of messages that can be processed by the server up to a new definition;

Counting of the number of client messages received by the output management module;

Subtraction of the number of client messages received from the maximum number to obtain a number of acceptable messages so as to determine a throttling level, and the output management module that has the best throttling level is selected.

If only a portion of the output management modules found during the routing receive throttling messages and the other portion is not subject to the throttling:

1. The following operations are carried out for each output management module that receives throttling messages:

Definition, at the level of the output management module, of a maximum number of messages that can be processed by the server up to a new definition;

Counting of the number of client messages received by the output management module;

Subtraction of the number of client messages received from the maximum number to obtain a number of acceptable messages so as to determine a throttling level;

The number of acceptable messages is divided by the time remaining up to a new definition of the maximum number of acceptable messages to obtain a request submission frequency;

The request submission frequency is added to the current time to determine from when the output management module can accept a new client message.

2. The client message is directed to the first output management module that receives throttling messages that can accept it 3. The client message is directed to another output management module if no output management module that receives throttling messages can accept it.

The load is distributed among the output management modules that do not receive throttling messages by the following operations.
1. Construction of a table of output management modules that do not receive throttling messages
2. Incrementing a counter with each client message received
3. Integer division of the counter number by the number of output management modules that do not receive throttling messages
4. Use of the remainder of the division as an index in the table to find the output management module that does not receive throttling messages to be used.

The attached drawings are provided by way of non-limiting examples. They represent an embodiment. They will make it possible to understand the invention easily.

Figure 2:
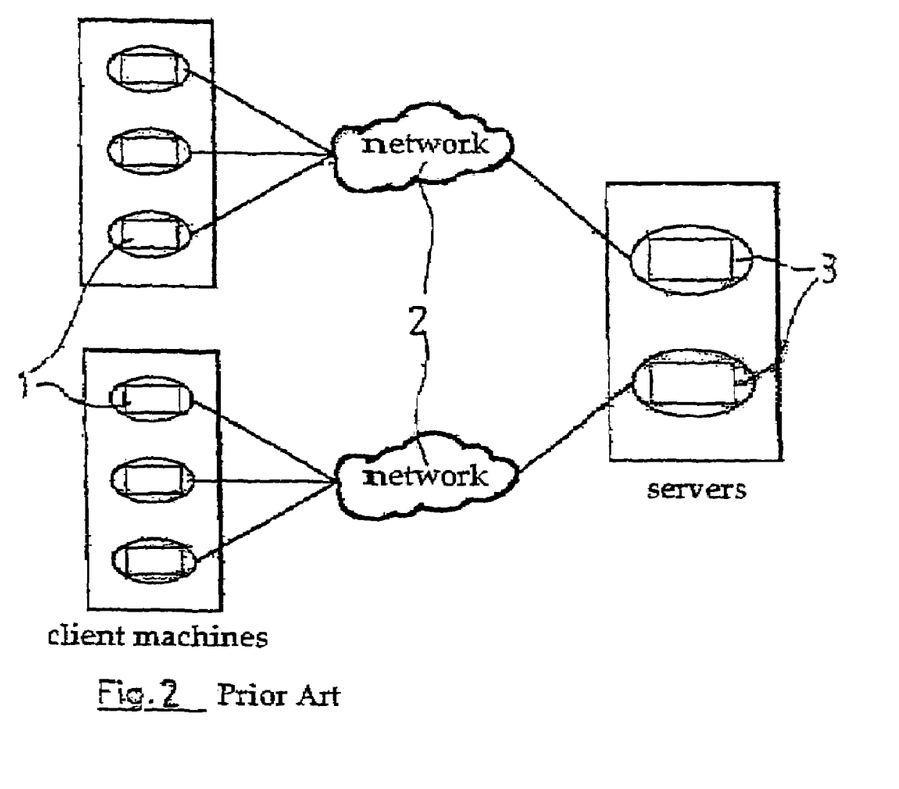

In FIG. 2, a standard organization of the computer network was shown. In this network, a number of client machines 1 are connected to one or more servers 3 that are often at a location that is removed from the client machines. By way of example, the clients can be private individuals who are connected to the network, for example, by means of a worldwide extension network 2, such as the Internet, or operators that specialize in the travel field. They can also be computer servers.

The networks currently use a large number of client machines. It is therefore preferably necessary to seek to minimize the number of connections among client machines 1 and servers 3, concentration and switching operations carried out by means of multiplexing.

In the case of FIG. 2, certain client machines 1 are, by means of network 2, connected with a single server 3. The clients should have knowledge of the server or servers to which they can be connected. The time for establishing connections is very important and in case of connection failure, the client generally cannot know if the failure is due to the network or to the server. The only fault tolerance mechanism that it can use is to try to establish a connection with another server that offers the same service, which is long, hazardous and complicates the use and the development of the client program.

Figure 1:
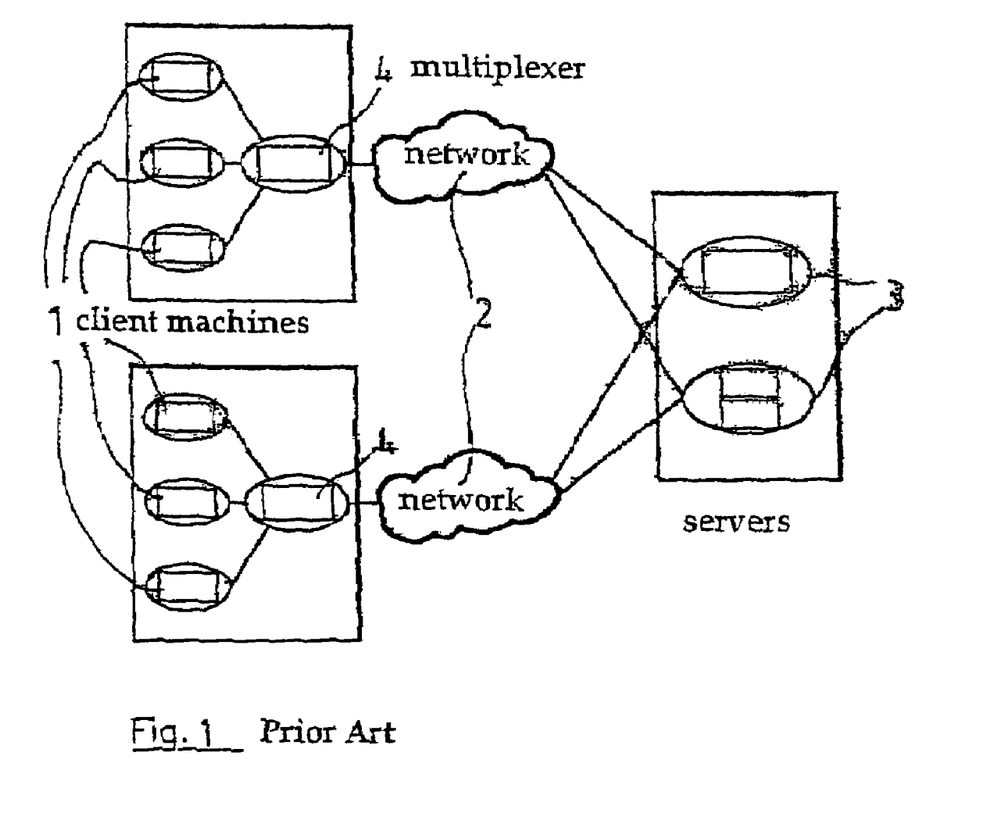
FIGS. 1 and 2 show two multiplexing embodiments according to the prior art.

Multiplexings were proposed that make possible a better response time. A configuration thereof is illustrated in FIG. 1. In this framework, multiplexers 4 are positioned downstream from a group of client machines 1 so as to manage their communications with network 2.

It is understood that if multiplexers 4 are multiplied, the management of the network becomes difficult. Actually in case of adaptation, development or evolution of certain constituent parts of the network, it is necessary to carry out operations of updating in multiplexers 4 that can be remote and can sometimes be located at a client site or commercial partner site.

Figure 3:
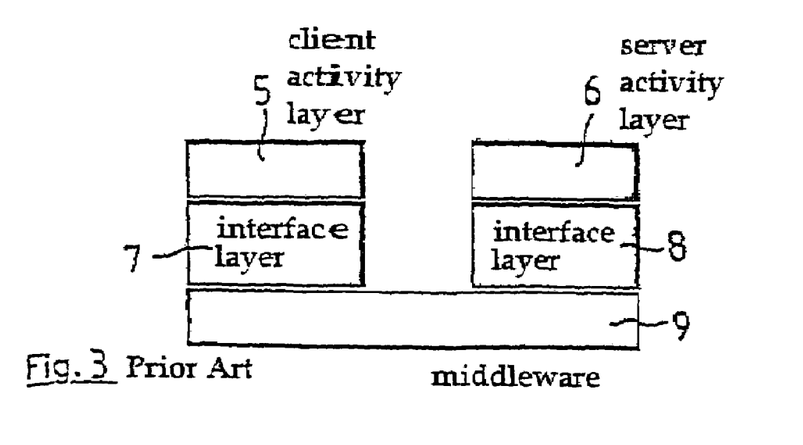
FIG. 3 shows a diagram of the installing of middleware between a client part and a server part.

To remedy these drawbacks and those disclosed previously for this type of multiplexing, the use of middleware 9 as shown in FIG. 3 was proposed.

In this figure, middleware 9 constitutes an intermediary software between a client part and a server part.

The client part comprises a client activity layer 5 where certain processing is carried out, as well as an interface layer 7 with middleware 9.

In contrast, a server activity layer 6 is present and communicates to middleware 9 by means of an interface layer 8.

The drawbacks of the uses of middleware 9 were already mentioned above.

Figure 4:
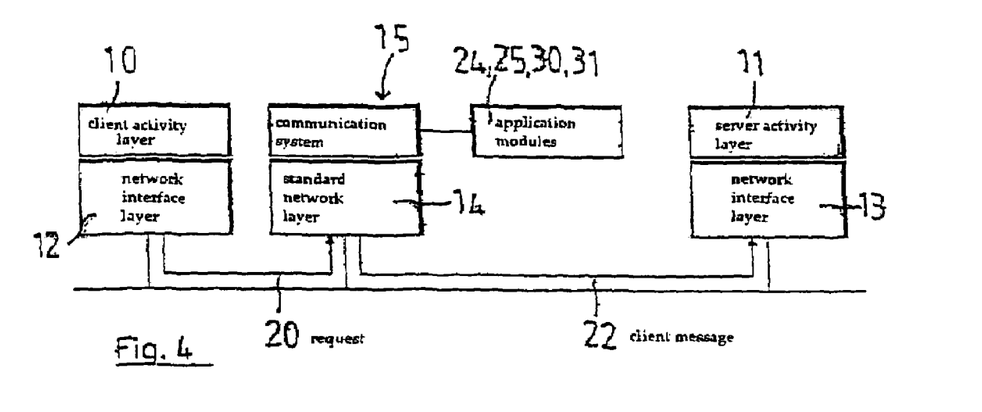
FIG. 4 is an overall view of the invention.
Figure 5:
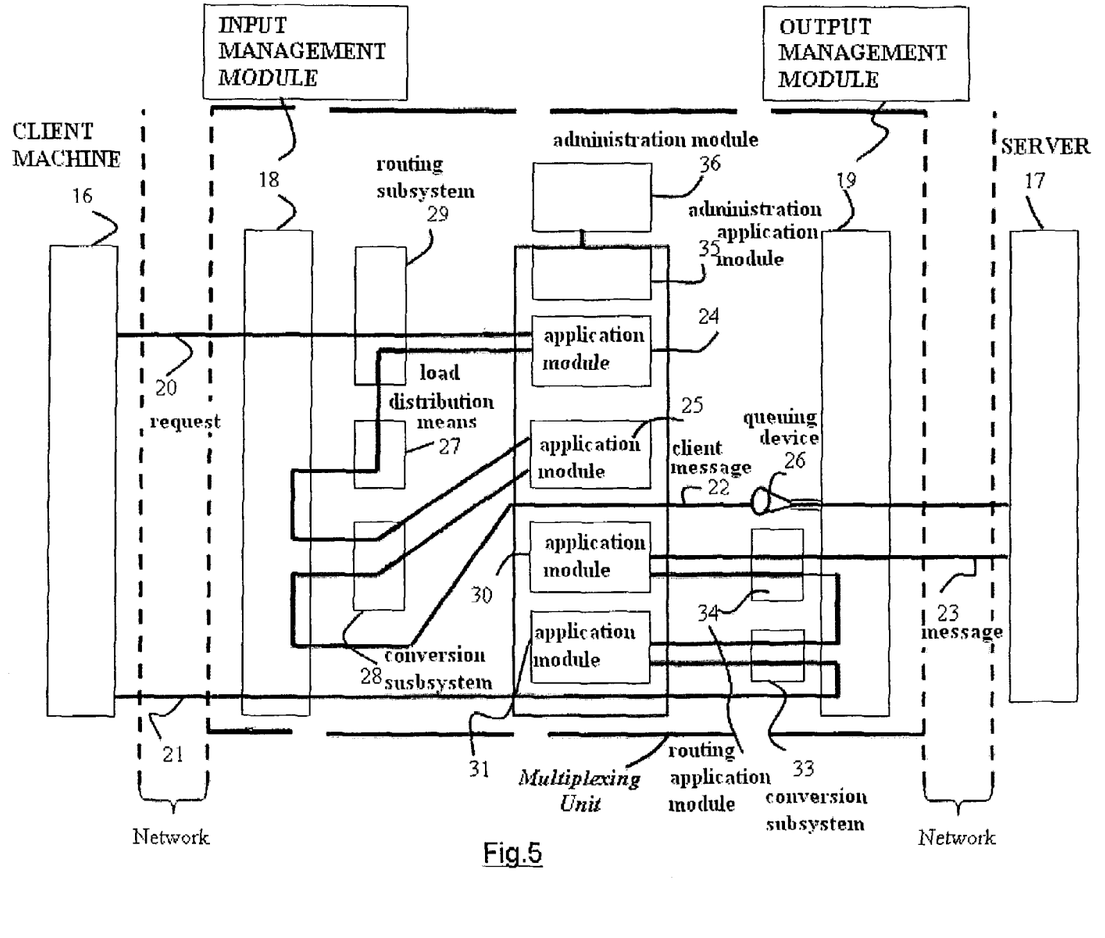
FIG. 5 illustrates various stages of operation of the invention.

The solution proposed by the invention is illustrated diagrammatically in FIGS. 4 and 5.

In a general way, it is seen in FIG. 4 that the invention connects a client activity layer 10 and a server activity layer 11. This connection is carried out by standard network interface layers 12, 13.

To carry out the communication, a communication system 15 according to the invention is present and connected to a standard network layer 14.

Diagrammatically, communication system 15 was shown in two diagram blocks that disclose the modularity of the invention.

Also present, via arrows, are message transfers from client activity layer 10 to server activity layer 11. The direction of the arrows, proposed here by way of example, goes in the client-server direction, but the reverse is also, of course, carried out.

A request 20 is addressed to communication system 15 from client activity layer 10 and, by means of communication system 15 according to the invention, is reflected at the activity layer of server 11 in a client message 22.

For the transmission of such a client message 22 to the server, routing functions, and optionally load distribution or else conversion, are carried out.

In the remainder of the description and to understand the invention well, the term "request 20" designates a message that is sent by the client and the word "response 21" designates a message that is received by the client.

By referring now to FIG. 5, it is seen that by way of example, a communication between a client machine 16 and a server 17 was shown.

Their connection is carried out by means of a multiplexing unit according to the invention. Such a unit can use a number of client machines 16 and servers 17. Furthermore, the system according to the invention, which integrates the thus presented multiplexing unit, can comprise other similar units according to the invention.

The proposed system is therefore perfectly modular and organized and can be monitored and administered in a centralized way.

Below, particular embodiments of the multiplexing unit according to the invention are described.

FIG. 5 shows the formation for each client machine 16 of an input management module 18. Such a management module 18 is created for each type of client machine to be connected and can be modified or eliminated as required.

The input management module ensures the reception of requests 20 that are obtained from the client machine and the transmission of responses 21 to these requests 20. The path followed by the request that is obtained from a client program supported by client machine 16 was identified by an arrow 20.

Furthermore, in the multiplexing unit, an output management module 19 is assigned to one or more servers 17. In a similar way, output management module 19 has as its function to receive the messages to be processed by server or servers 17 and to reflect them to the latter.

As shown, a queue files system is run to form a client message file 22 to be processed at the level of output management module 19. A queue files device identified by 26 is illustrated on this subject in FIG. 5.

Routing means are present so as to determine one or more output management modules 19, to which request 20, obtained from the client machine, will be transferred.

Connected, on the one hand, with input management module 18 and, on the other hand, with output management module 19, the routing means make it possible to define the identity of at least one target output management module for processing a request 20, and conversely, the identity of the client machine to which message 23 that is obtained from the target server should be addressed.

The routing means preferably comprise load distribution means 27 that will make it possible to define the identity of a single output management module 19 for processing request 20 according to the load parameters.

Embodiments of this distribution will be described later, but parameters that can be taken into account will be indicated here and now: the fault state of any servers, the throttling of servers, and the nature of the messages to be processed.

The load conditions are essentially defined in the system by messages of the maximum number of messages normally obtained from throttling agents. The latter can be installed at the level of servers or independent of one another.

Furthermore, an administration module 36 is described later that can maintain values by default to compensate for failure of the throttling agent, if necessary.

According to an advantageous possibility, routing means comprise one or more routing application modules 24, 30. These modules are connected to routing sub-systems 29, 34 connected with input management modules 18 and output management modules 19.

Routing application modules 24, 34 can be attached to the remainder of the routing means, which ensures a perfect modularity of operation.

Routing decisions are preferably made at the level of application modules 24, 34. These decisions are then applied by the remainder of the routing means.

Following the routing operations to be carried out, various application modules can be used and connected.

In view of the scope of the computer networks that are used, compatibility problems arise with regard to formats and transfer protocols used by the client applications and the server applications.

To remedy this, the multiplexing unit presented here comprises conversion means. These means ensure the conversion, if necessary, of the contents of requests 20 into client messages 22 that are compatible and therefore exploitable by the application program of target server 17. Likewise, the conversion means carry out a conversion of the contents of message 23 that is obtained from target server 17 into a response 21 that is compatible with the client program in question.

Advantageously, the design of the conversion means is similar to that of the routing means. This means that the conversion means comprise conversion sub-systems 28, 33 that can communicate with conversion application modules 25, 31 to which they are connected. In a way parallel to the routing means, it will be possible to use and to upgrade application modules 25, 31 according to the conversion functions that are to be carried out.

An application module is combined by configuration with an input or output management module. Consequently, it is possible to make several different application modules coexist within a multiplexing unit according to the invention. It is also possible to modify them or to use many of them without stopping the multiplexing unit.

The sub-systems as presented can invoke one or more attachable application modules.

Within the multiplexing unit, an administration module 36 will preferably be formed. Administration module 36 manages input management modules 18 and output management modules 19 of the unit. Module 36 creates, eliminates or modifies the input and output management modules. Furthermore, it can run statistical and verification functions on the state of modules, including the state of their load and their throttling. According to an advantageous possibility, the administration can be extended by one or more administration application modules 35. These modules make possible the administration of routing and conversion application modules in particular to provide them with routing tables and descriptions of messages.

Several multiplexing units as they have just been described can be used to constitute a communication system according to the invention. In this framework, the multiplexing units will be used in parallel and will manage a number of client machines 16 and servers 17.

In this way, the monitoring of the communication system will be carried out in a centralized way for all of the multiplexing units. The system can thus comprise a monitoring agent that can control administration modules 36 of the units.

By different management and monitoring tools, an operator, for example by means of a graphic interface, can manage and monitor the system by setting to work the monitoring agent, itself controlling administration modules 36.

Furthermore, several multiplexing units can be placed in parallel in connection with the use of extensions in the form of Dynamic Link Libraries (DLL). These extensions can be loaded, as desired, by one or the other of the multiplexing units so as to extend its functionalities. These functionalities will be able to be used in routing sub-systems 29, 34, in conversion sub-systems 28, 33 and in the monitoring and administration of the multiplexing units.

These dynamic link libraries can constitute all of the following elements: application modules 24, 25, 30, 31 and administration application 35.

The functionalities of the system can also be extended by this means in connection with the management of the throttling of the server.

Below, the communication process according to the invention that can be used both by the communication system described above and by the multiplexing units that are in the system, forming an integral part of the invention, is described.

Reference is also made to FIG. 5 for illustrating the stages of this process.

As indicated above in connection with the multiplexing unit, the clients are connected to an input management module. An output management module is connected to one or more servers or, according to another method, waits for the server connections. The principle of the invention is to accommodate existing clients and servers and their operational constraints without modification. When a request 20 is to be addressed to the remainder of the system for its processing, it is routed to a server 17 by observing routing data. Among the latter appears the address of input management module 18 and the network address of client machine 16.

Other parameters can be used to determine the path of request 20 and in particular the contents of the request. The routing will thus comprise an operation for monitoring and analysis of the contents of request 20.

The routing stage will preferably be carried out two times, one starting from a routing sub-system 29 in connection with input management module 18. The second is carried out by invoking at least one routing application module 24 that can be attached to sub-system 29. By using routing parameters, application module 24 determines the identity of one or more output management modules 19. The routing is then applied by sub-system 29.

In the case where several possibilities of target servers were defined, one of them can be chosen according to load distribution criteria.

Below, variants of the invention that can carry out such a load distribution between output management modules 19 according to throttling criteria will be described.

When the identity of output management module 19 is determined at the end of the routing operation, a conversion stage of request 20 into a client message 22 that is compatible with target servers 17 will be carried out.

When it is necessary, the conversion operation can also be carried out in two steps. The first consists in invoking a conversion application module 25 that is connected from a conversion sub-system 28. Sub-system 28 invokes one or more conversion application modules 25 according to the conversion function to be run.

Conversion application module 25 returns to sub-system 28 a client message 22 that is compatible with server 17.

This client message 22 is transferred to server 17 via output management module 19 of server 17.

At output management module 19, a queue file is created to receive client messages 22, to play a buffer role and to send the messages successively to server 17.

A queue file is required to the extent that input management modules 18 are "multithread". i.e., able to submit several requests simultaneously.

A different "thread" execution path is combined with each server 17 and the different execution paths pull messages in parallel from queue file 26.

Once the client message is processed at server 17, the latter returns a server message 23.

Corresponding to what was described at management module 18, a routing operation and then a conversion operation is carried out by invoking routing application modules 30 and conversion application modules 31.

The routing of message 23 is carried out based on the recognition of the nature of this message 23.

The conversion operation could be carried out before the routing function, but it is preferably carried out after. Actually, it is a longer operation but of a less uncertain outcome than that of the routing.

According to a preferred variant of the process according to the invention, throttling is administered for the server or servers, or for at least a portion of servers 17 included in the system.

The throttling is administered differently according to the number and the nature of the output management modules that are selected by the routing mechanism.

If a single output management module was found during the routing and receives throttling messages, its throttling is then managed by:

Definition, at the level of the output management module, of a maximum number of messages that can be treated by the server up to a new definition;

Counting the number of messages received by the output management module;

Subtraction of the number of messages from the maximum number to obtain a number of acceptable messages so as to determine a throttling level.

If all of the output management modules found receive throttling messages, then each output management module maintains a number of acceptable messages as described above. The routing mechanism selects the output management module with the largest number of acceptable messages, i.e., the best throttling level.

If a portion of the output management modules found receive throttling messages and another portion does not receive any and is therefore not subject to throttling, the purpose of the routing is to use as much as possible, within the imposed throttling limits, the throttled output management modules and then to evenly distribute the remaining load between the non-throttled output management modules. To do this, a request submission frequency is calculated for each throttled output management module by dividing the number of acceptable messages by the remaining time up to a new definition of the maximum number of acceptable messages and from this frequency, from when this output management module can accept a request. The routing mechanism selects the first throttled output management module that can accept a request and if no request is found, it selects a non-throttled management module according to the load distribution mechanism by default.

For this purpose, and according to a preferred variant, a counter is maintained that is increased by one for each message received and initialized again in the case of exceeding capacity. The routing mechanism constructs a table of selected output management modules. It calculates the remainder of the integer division of the counter by the number of output management modules selected and selects the output management module that corresponds to this index in the table.

REFERENCES

1. Client machines
2. Communication networks
3. Server
4. Multiplexer
5. Client activity layer
6. Server activity layer
7. Middleware interface layer
8. Middleware interface layer
9. Middleware
10. Client activity layer
11. Server activity layer
12. Network interface layer
13. Network interface layer
14. Generic network layer
15. Communication system
16. Client machine
17. Server
18. Input management module
19. Output management module
20. Request
21. Reponse
22. Client message
23. Server message
24, 30. Routing application module
25, 31. Conversion application module
26. Queue file device
27. Load distribution means
28, 33. Conversion sub-system
29, 34. Routing sub-system
35. Administration application module
36. Administration module

The invention claimed is:

1. Multiplexing unit for communication in a computer network among a plurality of client machines that support client programs and a plurality of servers that support application programs, the client programs and the application programs can use different message protocols, said multiplexing unit comprising:

for each client machine, an input management module that receives requests from client programs and transmits responses to the client programs;

for each server, an output management module that transmits client messages to the server that are addressed to the server and that transmits responses to the input management modules, wherein the output management modules comprises a queuing device that concentrates the input to the servers;

routing means that are connected to said input management modules and said output management modules, said routing means comprises:

a first routing subsystem connected to said input management module and a second routing subsystem connected to said output management module;

a first routing application module connected to said first routing subsystem and a second application module connected to said second routing subsystem, said first and second routing application modules carrying out routing functions according to predetermined rules to be applied by the first and second routing subsystems, said routing means define the identity of plural output management modules for processing the request and determine the identity of one said client machine to which a message that is obtained from a corresponding target server is to be addressed;

an administration module connected to said input management module and said output management module that administers the creation, the suppression, the modification and the state of operation of said input management modules and said output management modules; and conversion means connected to a respective input management module and a respective output management module that convert, when needed, the request into a client message that can be processed by the application program of target server and that convert the message that is obtained from target server into the response that is processed with the client program.

2. Unit, according to claim 1, wherein the routing means comprise load distribution means connected to a respective routing subsystem module of a corresponding input management module, said load distribution means define the identity of a target server for processing a request according to load conditions.

3. Unit, according to claim 1, wherein the conversion means comprise a first conversion subsystem connected to the input management module and a second conversion subsystem connected to the output management module, and at least one conversion application module connected to the first and second conversion subsystems, said at least one conversion application module carries out predetermined conversion functions to be applied by the first and second conversion subsystems.

4. System for communication in a computer network among a plurality of client machines that support client programs and at least one server that support application programs, wherein when the client programs and the application programs are incompatible, said system integrates at least one multiplexing unit, comprising:

for each client machine, an input management module that receives requests from client programs and transmits responses to the client programs;

for each server, an output management module that transmits client messages to the server that are addressed to the server and that transmits responses to the input management modules, wherein the output management modules comprises a queuing device that concentrates the input to the servers;

routing means that are connected to said input management modules and said output management modules, said routing means comprises:

a first routing subsystem connected to said input management module and a second routing subsystem connected to said output management module;

a first routing application module connected to said first routing subsystem and a second application module connected to said second routing subsystem, said first and second routing application modules carrying out routing functions according to predetermined rules to be applied by the first and second routing subsystems, said routing means define the identity of at least one output management module for processing the request and determine the identity of one said client machine to which a message that is obtained from a corresponding target server is to be addressed;

an administration module that administers the creation, the suppression, the modification and the state of operation of said input management modules and said output management modules; and conversion means that convert, when needed, the request into a client message that can be processed by the application program of target server and that convert the message that is obtained from target server into the response that is processed with the client program.

5. System for communication in a computer network according to claim 4 and further comprising a monitoring agent that can control the administration module of the multiplexing unit or units.

6. System for communication in a computer network according to claim 4, further comprising extensions in dynamic link library form that can be loaded by a multiplexing unit to hold application modules of said routing means.

7. Process for communication in a computer network among a plurality of client machines that support client programs and at least one server that support application programs, whereby the client programs and the application programs may be incompatible, said process, comprising:

connecting each client machine under consideration to an input management module that receives requests from the client program and transmits responses to the client program;

connecting an output management module that transmits to the server client messages that are addressed to the server and that transmits responses to the input management modules of the client machines connected to the server;

routing the request by recognition of the data of the request including the address of the input management module and the network address of the client machine from which it is obtained using routing means comprising a first routing subsystem connected to said input management module, a second routing subsystem connected to said output management module, a first routing application module connected to said first routing subsystem, and a second application module connected to said second routing subsystem, said first and second routing application modules carrying out routing functions according to predetermined rules to be applied by the first and second routing subsystems, then determining said at least one target server according to said data;

converting the request into a client message of a format that is compatible with said at least one target server;

routing the client message to the output management module of the target server for transmission;

routing and transmitting a message that is obtained from the target server by the output management module by recognition of the message, then determining a corresponding client machine according to the result of this recognition;

if necessary, before or after its routing, the message that is obtained from the target server is converted into a response of a format that is compatible with the client machine; and routing the response to the input management module of the client machine for transmission.

8. Process of communication, according to claim 7, wherein the data of the request that are recognized by its routing comprise the nature of its contents.

9. Process of communication, according to claim 7, wherein at least one routing application module that can be attached to carry out predetermined routing functions is invoked for the routing of the request and the message that is obtained from target server.

10. Process of communication according to claim 7, wherein at least one conversion application module that can be attached to carry out predetermined conversion functions is invoked for the conversion of the request and the message obtained from target server.

11. Process of communication according to claim 7, wherein if a single output management module was found during routing and receives throttling messages, the throttling is then administered by:

defining, at the level of output management module, a maximum number of messages that can be processed by the server up to a new definition;

counting the number of messages received by the output management module; and determining a throttling level by subtracting the number of messages received from the maximum number to obtain a number of acceptable messages.

12. Process of communication, according to claim 7, wherein if all of the output management modules that are found during the routing receive throttling messages, the following operations are carried out for each one:

defining, at the level of output management module, a maximum number of messages that can be processed by the server up to a new definition;

counting the number of client messages (22) received by the output management module;

selecting the output management module that has the best throttling level by subtracting the number of client messages received from the maximum number to obtain a number of acceptable messages so as to determine a throttling level.

13. Process of communication, according to claim 7, wherein if only a portion of output management modules found during the routing receive throttling messages and the other portion is not subject to the throttling then the following operations are carried out for each output management module that receives throttling messages:

defining, at the level of output management module, a maximum number of messages that can be processed by the server up to a new definition;

counting the number of client messages received by the output management module;

determining a throttling level by subtracting the number of client messages received from the maximum number to obtain a number of acceptable messages;

dividing number of acceptable messages by the time remaining up to a new definition of the maximum number of acceptable messages to obtain a request submission frequency;

adding the request submission frequency to the current time to determine from when the output management module can accept a new client message;

directing the message to a first output management module that receives throttling messages that can accept the message; and directing the message to another output management module if no output management module that receives throttling messages can accept the message.

14. Process of communication, according to claim 13, wherein the load is distributed among output management modules that do not receive throttling messages by the following operations:

constructing a table of output management modules that do not receive throttling messages;

incrementing a counter with each client message received;

performing integer division of the counter number by the number of output management modules that do not receive throttling messages; and using the remainder of the division as an index in the table to find output management module that does not receive throttling messages to be used.

15. The process according to claim 7, wherein said routing comprises routing the request through a routing subsystem and a load distribution means, said routing subsystem and said load distribution means being directly connected to said input management module.

16. Multiplexing unit for communication in a computer network among a plurality of client machines that support client programs and a plurality of servers that support application programs, the client programs and the application programs can use different message protocols, said multiplexing unit comprising:

for each client machine, an input management module that receives requests from client programs and transmits responses to the client programs;

for each server, an output management module that transmits client messages to the server that are addressed to the server and that transmits responses to the input management modules, wherein the output management modules comprises a queuing device that concentrates the input to the servers;

routing means that are connected to said input management modules and said output management modules, said routing means comprises:

a first routing subsystem connected to said input management module and a second routing subsystem connected to said output management module;

a first routing application module connected to said first routing subsystem and a second application module connected to said second routing subsystem, said first and second routing application modules carrying out routing functions according to predetermined rules to be applied by the first and second routing subsystems, said routing means define the identity of at least one output management module for processing the request and determine the identity of one said client machine to which a message that is obtained from a corresponding target server is to be addressed;

an administration module connected to said input management module and said output management module that administers the creation, the suppression, the modification and the state of operation of said input management modules and said output management modules; and conversion means connected to said input management module and said output management module that convert the request into a client message that is processed by the application program of the target server and that convert the message that is obtained from target server into the response that is processed with the client program.

17. The multiplexing unit according to claim 16, wherein the routing means further comprises a load distribution means, said first subsystem and said load distribution means being directly connected to said input management module.

* * * * *